US010940721B2

(12) United States Patent
Suita

(10) Patent No.: US 10,940,721 B2
(45) Date of Patent: Mar. 9, 2021

(54) PNEUMATIC RADIAL TIRE

(71) Applicant: TOYO TIRE & RUBBER CO., LTD., Itami (JP)

(72) Inventor: Harunobu Suita, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 224 days.

(21) Appl. No.: 16/218,923

(22) Filed: Dec. 13, 2018

(65) Prior Publication Data

US 2019/0193468 A1 Jun. 27, 2019

(30) Foreign Application Priority Data

Dec. 27, 2017 (JP) .............................. JP2017-251168

(51) Int. Cl.
*B60C 11/00* (2006.01)
*B60C 11/03* (2006.01)
(Continued)

(52) U.S. Cl.
CPC ........ *B60C 11/005* (2013.01); *B60C 11/0058* (2013.01); *B60C 11/01* (2013.01);
(Continued)

(58) Field of Classification Search
CPC ............... B60C 11/005; B60C 11/0058; B60C 11/0066; B60C 11/0075; B60C 11/0041;
(Continued)

(56) References Cited

U.S. PATENT DOCUMENTS 5,720,831 A * 2/1998 Aoki ....................... B60C 11/00
152/29
6,196,288 B1 * 3/2001 Radulescu ........... B60C 11/0309
152/209.17
(Continued)

FOREIGN PATENT DOCUMENTS

JP 2004-345432 A 12/2004
JP 2005263175 A * 9/2005
(Continued)

OTHER PUBLICATIONS

Machine Translation: JP-2005263175-A, Wakabayashi, Noboru, (Year: 2020).*
(Continued)

*Primary Examiner* — Kendra Ly
(74) *Attorney, Agent, or Firm* — Westerman, Hattori, Daniels & Adrian, LLP

(57) ABSTRACT

A tire has cap rubber that forms a contact patch. The cap rubber has a plurality of lugs. A shoulder lug, which among the plurality of lugs is that which is located outwardmost in a tire width direction, has a narrow groove that extends in the tire circumferential direction and that partitions the shoulder lug into a main lug portion toward the interior in the tire width direction, and a sacrificial lug portion toward the exterior in the tire width direction; and low-modulus rubber, for which stress at a given elongation is lower than that of the cap rubber, is arranged at a corner where the contact patch at the main lug portion and a groove side face toward the interior in the tire width direction which forms the narrow groove intersect.

7 Claims, 6 Drawing Sheets

(51) Int. Cl.
*B60C 11/12* (2006.01)
*B60C 11/01* (2006.01)

(52) U.S. Cl.
CPC ........... *B60C 11/0311* (2013.01); *B60C 11/12* (2013.01); *B60C 2011/0025* (2013.01); *B60C 2011/013* (2013.01); *B60C 2011/0348* (2013.01); *B60C 2011/0393* (2013.01); *B60C 2011/0397* (2013.01)

(58) Field of Classification Search
CPC ............... B60C 11/01; B60C 2011/013; B60C 2011/016; B60C 2011/341
See application file for complete search history.

(56) References Cited

U.S. PATENT DOCUMENTS

2013/0092302 A1     4/2013   Okabe
2013/0126059 A1*    5/2013   Sandstrom ............ B60C 19/082
                                                            152/152.1

FOREIGN PATENT DOCUMENTS

JP        2013-86594 A    5/2013
WO          00/53437 A1   9/2000

OTHER PUBLICATIONS

Office Action dated Sep. 28, 2020, issued in counterpart CN Application No. 201811524082.4, with English translation (16 pages).

* cited by examiner

PNEUMATIC RADIAL TIRE

BACKGROUND OF THE INVENTION

Field of the Invention

The present disclosure relates to a pneumatic radial tire intended for heavy loads.

Description of the Related Art

With pneumatic tires intended for heavy loads such as may be employed in trucks, buses, and so forth, a type of uneven wear is known in which there is a general tendency for compression within the contact patch that is produced during contact with the ground to cause contact patch pressure to increase in the vicinity of the edges of the contact patch at shoulder lugs, as a result of which the amount of wear in the vicinity of the edges of the contact patch at shoulder lugs is greater than at other lugs within the contact patch. Widely carried out to suppress such uneven wear is a method in which narrow groove(s) that extend in the tire circumferential direction and that partition the shoulder lug into main lug portion(s), and into sacrificial lug portion(s) toward the exterior in the tire width direction therefrom, are provided in the vicinity of the edge(s) of the contact patch at shoulder lug(s).

Arrangement of high-modulus rubber at the corner between the narrow groove and the main lug portion is described at Japanese Patent Application Publication Kokai No. 2013-86594. There is a description to the effect that arrangement of high-modulus rubber makes it possible to reduce the amount of shear deformation in the tire circumferential direction during contact with the ground, and to the effect that because it is rubber that tends not to wear, it is possible to effectively suppress stepped wear.

However, with tires intended for highways where it is envisioned that one will be driving straight ahead such as is primarily the case when driving on highways in the United States and so forth, compression within the contact patch that is produced during contact with the ground can cause a lateral force to act that is directed from the exterior to the interior in the tire width direction. This lateral force produces localized wear at the end of the main lug portion of the shoulder lug. In particular, the end of the main lug portion is such that, contact patch pressure being high as compared with a central region in the tire width direction of the shoulder lug, the lateral force due to compression within the contact patch during contact with the ground is large, and slippage in the lateral direction produces an increase in abrasive energy in the tire width direction. During the initial stage of use, there is a tendency for wear to occur at the end of the main lug portion before it occurs at the central region of the shoulder lug, and there is a tendency for the end of the main lug portion to experience wear sooner and in more localized fashion—and for stepped wear to occur (see second diagram at FIG. 6)—than at the central region of the shoulder lug. Upon occurrence of stepped wear, braking forces produced during braking and acting in the front-to-back/back-to-front direction of the tire cause the stepped wear to advance from the exterior to the interior in the tire width direction (see second through fourth diagram at FIG. 6). Accordingly, it is thought that uneven wear might be suppressed if occurrence of wear at the end of the main lug portion could be delayed.

SUMMARY OF INVENTION

The present disclosure was conceived in view of such problems, it being an object thereof to provide a pneumatic radial tire for which occurrence of uneven wear is suppressed.

According of the present disclosure, there is provided a pneumatic radial tire comprising cap rubber that forms a contact patch;

wherein the cap rubber has a plurality of lugs that extend in a tire circumferential direction and that are partitioned by a major groove extending in the tire circumferential direction;

a shoulder lug, which among the plurality of lugs is that which is located outwardmost in a tire width direction, has a narrow groove that extends in the tire circumferential direction and that partitions the shoulder lug into a main lug portion toward the interior in the tire width direction, and a sacrificial lug portion toward the exterior in the tire width direction; and low-modulus rubber, for which stress at a given elongation is lower than that of the cap rubber, is arranged at a corner where the contact patch at the main lug portion and a groove side face toward the interior in the tire width direction which forms the narrow groove intersect.

Because low-modulus rubber, for which the stress at a given elongation is lower than that of cap rubber, is thus arranged at the corner of main lug portion, contact patch pressure at the end of main lug portion is alleviated, shear force and slippage in the tire width direction are made small, abrasive energy at the end of main lug portion is reduced, and it is possible to delay occurrence of wear at the end of main lug portion. It is therefore possible to suppress occurrence of uneven wear.

DETAILED DESCRIPTION OF THE PREFERRED EMBODIMENTS

Below, a pneumatic radial tire in an embodiment in accordance with the present disclosure is described with reference to the drawings.

Figure 1:
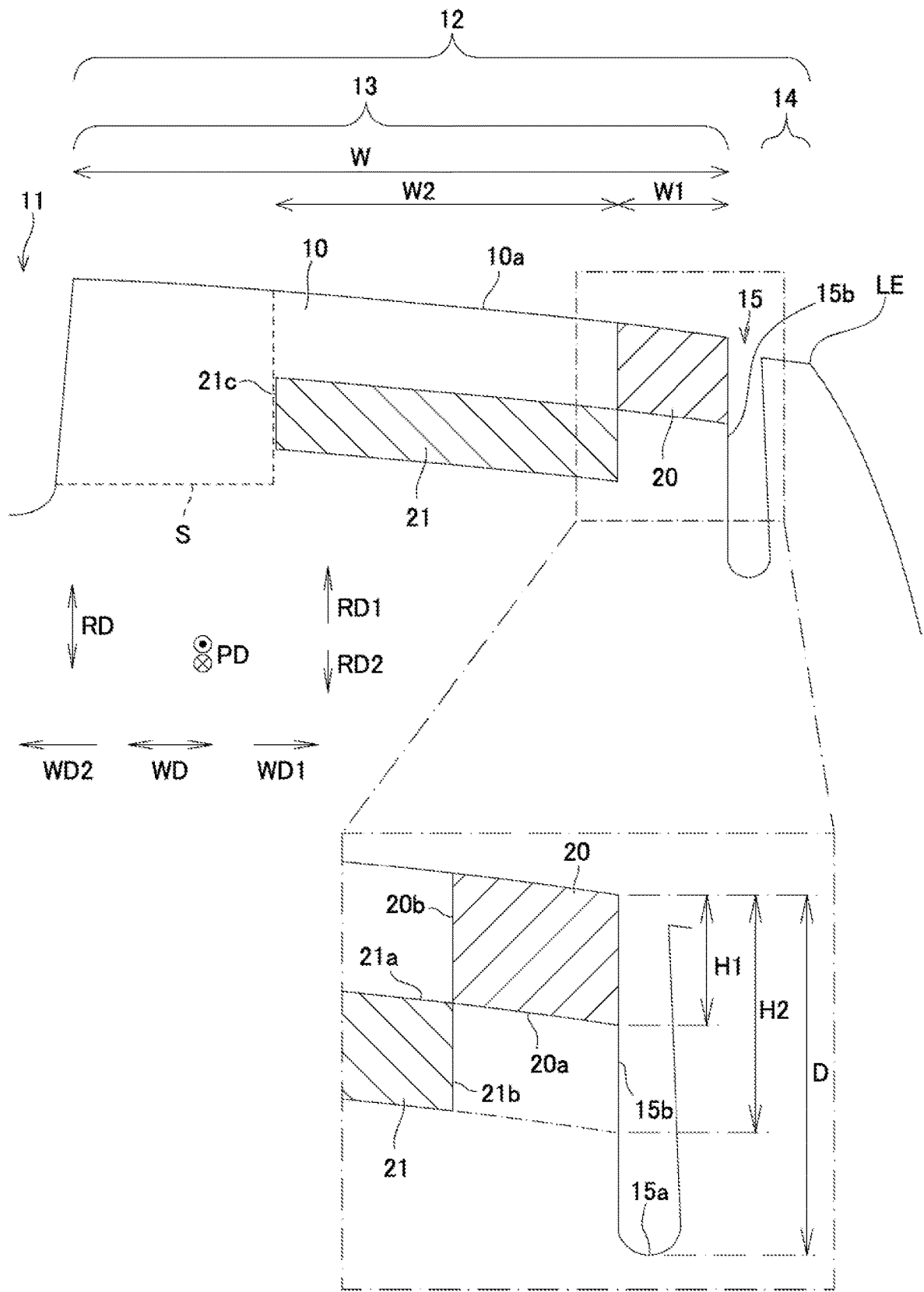
FIG. 1 Drawing of a tire meridional section at a shoulder lug in accordance with embodiment of the present disclosure FIG. 2A Drawing of a tire meridional section showing a comparative example FIG. 2B Drawing of a tire meridional section showing a variation FIG. 3A Drawing of a tire meridional section showing a comparative example FIG. 3B Drawing of a tire meridional section showing a variation FIG. 4 Drawing of a tire meridional section showing a variation FIG. 5 Drawing of a tire meridional section showing schematically the way in which wear might occur at the tire shown in FIG. 1

FIG. 1 is an exemplary sectional view taken along the tire meridional direction at a shoulder lug in a pneumatic radial tire in accordance with the present invention. As shown in FIG. 1, a pneumatic radial tire associated with the present embodiment has cap rubber 10 which forms the contact patch. Cap rubber 10 has a plurality of major grooves 11 extending in the tire circumferential direction PD, and a plurality of lugs that extend in the tire circumferential direction PD and that are partitioned by the plurality of major grooves 11. FIG. 1 shows shoulder lug 12 which is outwardmost in the tire width direction WD.

As shown in FIG. 1, shoulder lug 12 has narrow groove 15 that extends in the tire circumferential direction. Narrow groove 15 partitions shoulder lug 12 into main lug portion 13 toward the interior WD2 in the tire width direction, and sacrificial lug portion 14 toward the exterior WD1 in the tire width direction.

Shoulder lug 12 is located toward the exterior in the tire width direction from major groove 11 that extends in the tire circumferential direction in outwardmost fashion in the tire width direction. At the example indicated in the present embodiment, shoulder lug 12 which includes main lug portion 13 and sacrificial lug portion 14 is of rib-type constitution. Note, however, that rib-type, block-type, lug-type, and other such tread patterns may be employed at the pneumatic tire of the present invention, there being no particular limitation with respect thereto.

To effectively reduce uneven wear at the pneumatic tire, it is preferred that narrow groove 15 be provided at a region within 5% of the tread contact patch width as measured from contact patch edge LE. While groove depth D of this narrow groove 15 may be varied as appropriate depending on the size of the pneumatic tire, 10 mm to 18 mm may be cited as an example. Groove depth D of narrow groove 15 is on the same order as the groove depth of the major grooves. Furthermore, whereas in accordance with the present embodiment groove width in tire width direction WD of narrow groove 15 is made to gradually increase as one proceeds from the tread surface toward groove bottom 15a, it is also possible for groove width to be constant. As the groove width of narrow groove 15, 1 mm to 2 mm may be cited as an example. Furthermore, 2 mm to 10 mm may be cited as an example of the width of sacrificial lug portion 14 at the location of groove bottom 15a.

As shown in FIG. 1, low-modulus rubber 20 is arranged at the corner where contact patch 10a at main lug portion 13 and groove side face 15b toward the interior WD2 in the tire width direction which forms narrow groove 15 intersect. Low-modulus rubber 20 is such that stress at a given elongation is lower than that of cap rubber 10. Stress at a given elongation may be measured in accordance with "3.7 Stress at a Given Elongation, S" at JIS K 6251:2010. When the tire is new, low-modulus rubber 20 is exposed at a portion of contact patch 10a at main lug portion 13, and is exposed at a portion of groove side face 15b of narrow groove 15.

While low-modulus rubber 20 may extend as far as groove bottom 15a of narrow groove 15 along narrow groove 15, this may be arranged at only a portion of the region toward contact patch 10a. When the progress of wear is divided into three stages, these being the initial stage of wear, the intermediate stage thereof, and the final stage thereof, to suppress wear at the corner of main lug portion 13 during the initial stage of wear, it is preferred that depth H1 of low-modulus rubber 20 be a depth that is not less than 30% of depth D in the tire radial direction RD of narrow groove 15 as measured from contact patch 10a. H1≥D×30%. It is preferred that width W1 in the tire width direction WD of low-modulus rubber 20 be not less than 10% of dimension W in the tire width direction WD of main lug portion 13. This range is because this is a location at which wear tends to proceed, contact patch pressure being high as compared with that toward the center of main lug portion 13, inasmuch as it is the corner of main lug portion 13.

By thus causing low-modulus rubber 20 to be arranged at the corner of main lug portion 13, because the contact patch pressure at the end (corner) of main lug portion 13 is alleviated, shear force and slippage along the tire width direction WD are made small, and abrasive energy is reduced, it is possible to delay occurrence of wear at the end of main lug portion 13.

While employment of low-modulus rubber 20 causes delay in occurrence of wear at the end (corner) of main lug portion 13, stepped wear will nonetheless eventually occur. At such time, it is the region at main lug portion 13 which is toward the interior from low-modulus rubber 20 that is subject to erosion by stepped wear. The force from braking causes stepped wear to progress toward the interior WD2 in the tire width direction.

As shown in FIG. 1, in accordance with the present embodiment, high-modulus rubber 21 for which the stress at a given elongation is higher than that of cap rubber 10 is therefore arranged thereat. High-modulus rubber 21 is arranged at a region that is toward the interior RD2 in the tire radial direction and that is toward the interior WD2 in the tire width direction from low-modulus rubber 20. When the tire is new, high-modulus rubber 21 is not exposed at contact patch 10a.

By thus causing high-modulus rubber 21 to be present at location(s) subject to erosion by stepped wear, wear directed toward the interior RD2 in the tire radial direction occurs more readily than the stepped wear that would otherwise have proceeded toward the interior WD2 in the tire width direction. As a result, it is possible to suppress progress of stepped wear, and there is a tendency for the wear that occurs at main lug portion 13 to be a more uniform sort of wear that is directed toward the interior RD2 in the tire radial direction.

High-modulus rubber 21 of the present embodiment is arranged within a range that is 30% to 60% of depth D along the tire radial direction RD of narrow groove 15 as measured from contact patch 10a. If the depth along the tire radial direction RD of high-modulus rubber 21 is taken to be H2, then it may be that H2=D×60%. This is merely one example, there being no limitation with respect thereto. It is preferred that width W2 along the tire width direction WD of high-modulus rubber 21 be 35% to 75% of dimension W along the tire width direction WD of main lug portion 13.

Figure 2A:
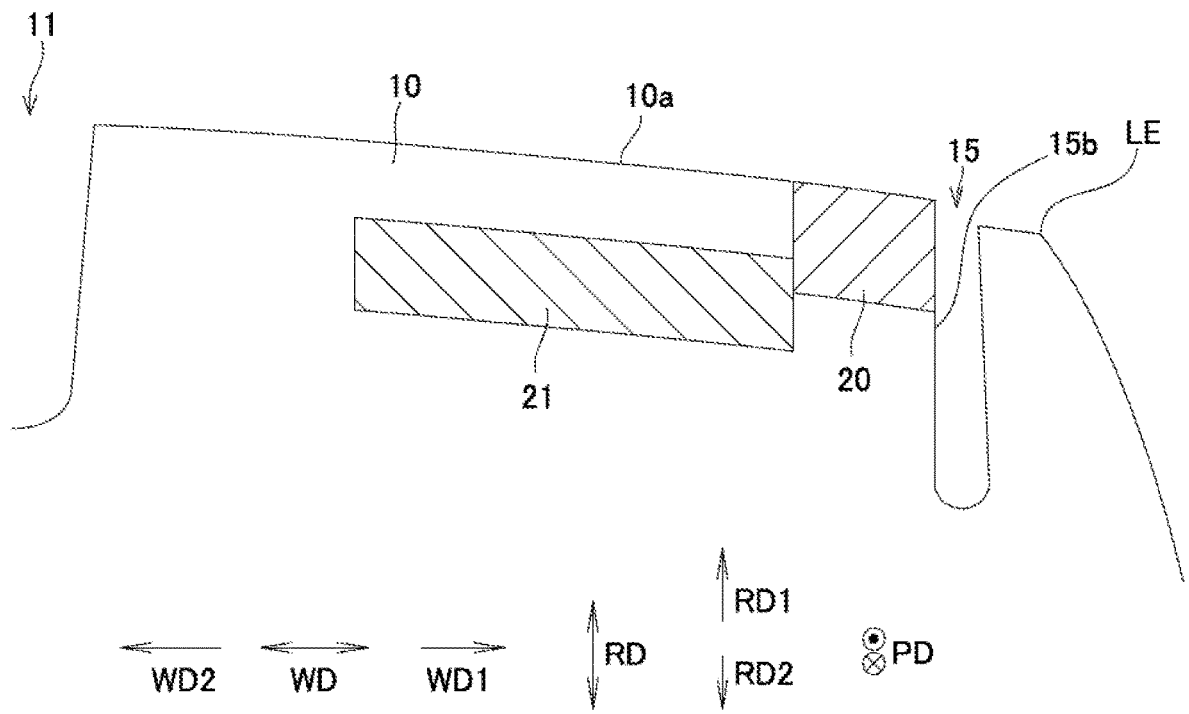
Figure 2B:
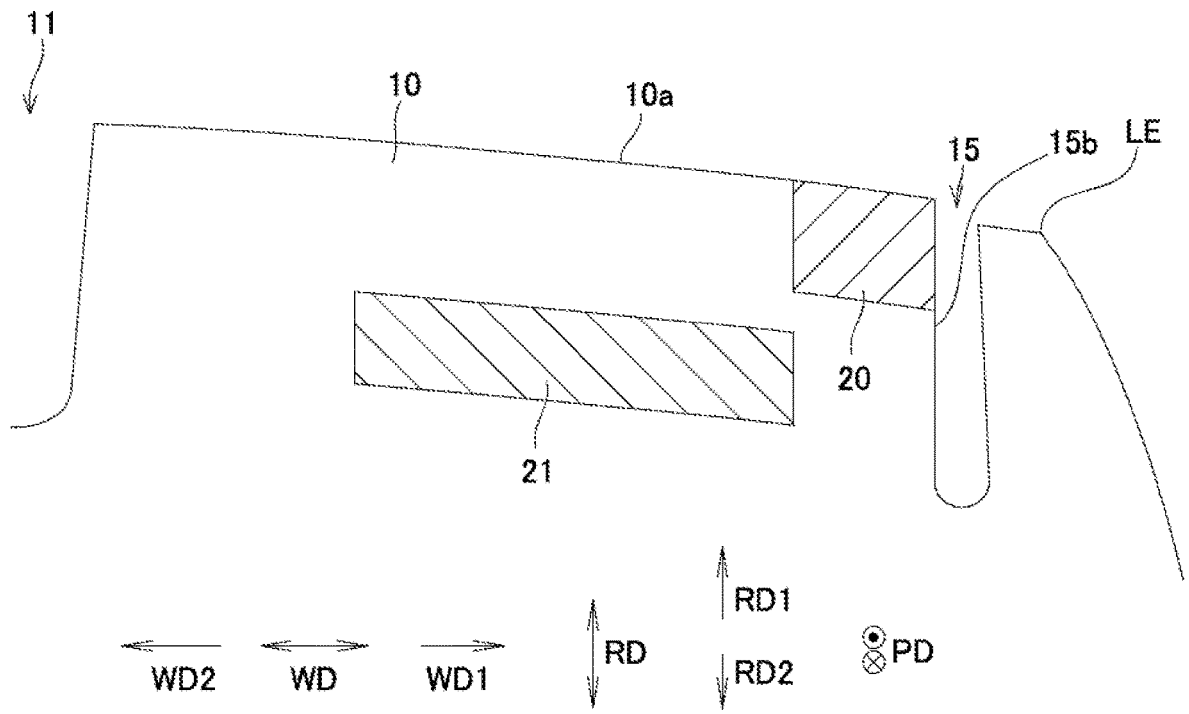

FIG. 2A shows a comparative example. FIG. 2B shows a variation. FIG. 2A is an example in which the locations in the tire radial direction RD of low-modulus rubber 20 and high-modulus rubber 21 overlap. With such a constitution, it is thought that high-modulus rubber 21 becomes exposed before low-modulus rubber 20 is completely worn away, causing deterioration in the way in which wear occurs. As shown in FIG. 1 and FIG. 2B, it is therefore preferred that high-modulus rubber 21 be arranged toward the interior RD2 in the tire radial direction from low-modulus rubber 20. As shown in FIG. 2B, cap rubber 10 may be present in intervening fashion between low-modulus rubber 20 and high-modulus rubber 21 such that low-modulus rubber 20 and high-modulus rubber 21 are separated in the tire radial direction RD. As shown in FIG. 1, it is preferred that outside end 21a in the tire radial direction of high-modulus rubber 21 and inside end 20a in the tire radial direction of low-modulus rubber 20 be coplanar along the tire radial direction RD.

Figure 3A:
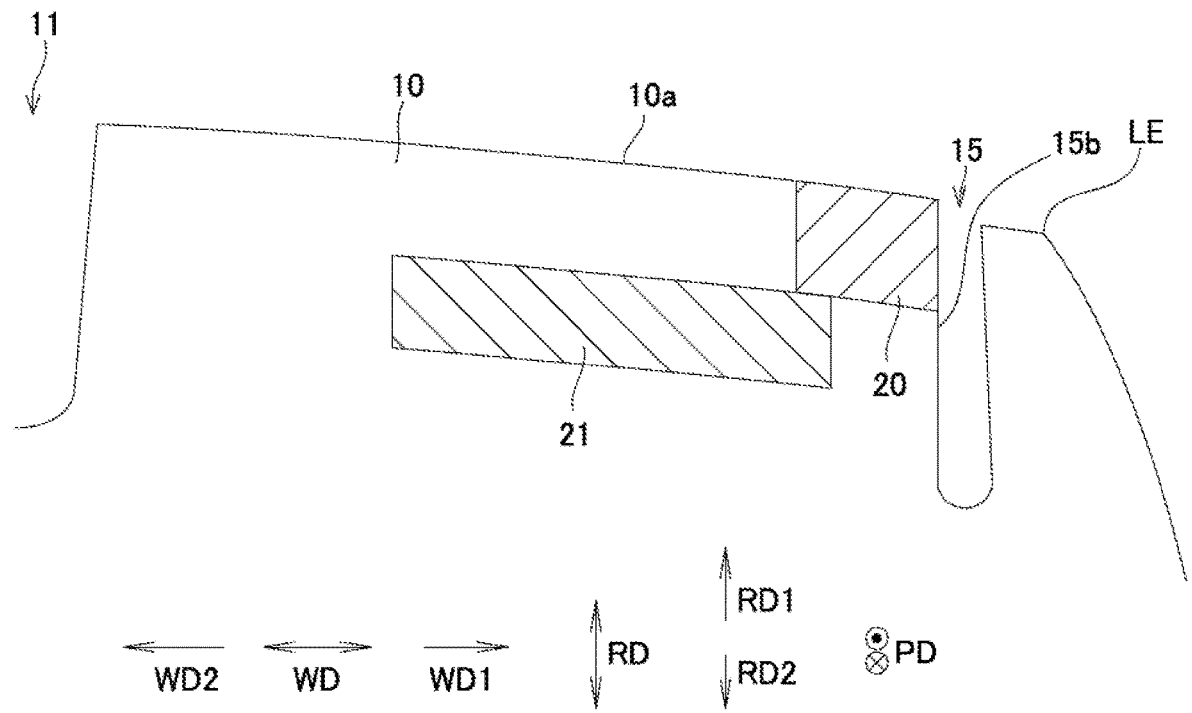
Figure 3B:
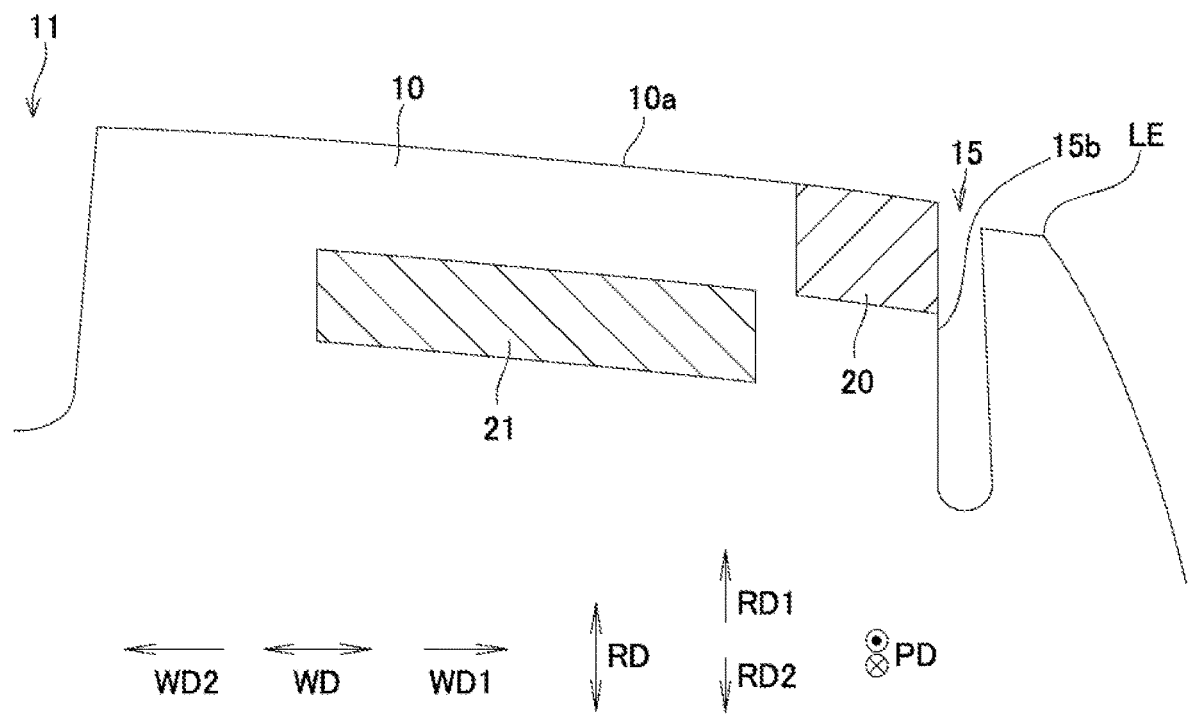

FIG. 3A shows a comparative example. FIG. 3B shows a variation. At FIG. 3A, the locations in the tire width direction WD of high-modulus rubber 21 and low-modulus rubber 20 overlap; i.e., high-modulus rubber 21 is arranged below low-modulus rubber 20. With such a constitution, it is thought that uniform wear is impeded. As shown in FIG. 1 and FIG. 3B, it is therefore preferred that high-modulus rubber 21 be arranged toward the interior WD2 in the tire width direction from low-modulus rubber 20. As shown in FIG. 3B, cap rubber 10 may be present in intervening fashion between low-modulus rubber 20 and high-modulus rubber 21 such that low-modulus rubber 20 and high-modulus rubber 21 are separated in the tire width direction WD. As shown in FIG. 1, it is preferred that outside end 21b in the tire width direction of high-modulus rubber 21 and inside end 20b in the tire width direction of low-modulus rubber 20 be coplanar with each other and with a plane parallel to contact patch 10a.

As shown in FIG. 1, main lug portion 13 has sipe S that extends toward the exterior WD1 in the tire width direction from adjacent major groove 11 toward the interior WD2 in the tire width direction at main lug portion 13 and that terminates at the interior of main lug portion 13. Innermost end 21c in the tire width direction of high-modulus rubber 21 is arranged at a location that, as viewed along the tire circumferential direction PD, does not appear to overlap sipe S. That is, high-modulus rubber 21 is not arranged within a region that, as viewed along the tire circumferential direction PD, would appear to overlap sipe S.

The region at which sipe S is arranged is such that braking forces are relieved, there is little tendency to slip, stepped wear tends not to occur, and wear proceeds uniformly and in such fashion as to be directed toward the interior RD2 in the tire radial direction. High-modulus rubber 21 for suppression of stepped wear need not be employed in the region at which sipe S is arranged. This is because arranging high-modulus rubber 21 in the region at which sipe S is arranged would cause wear toward the interior RD2 in the tire radial direction to be promoted more than is necessary.

Figure 4:
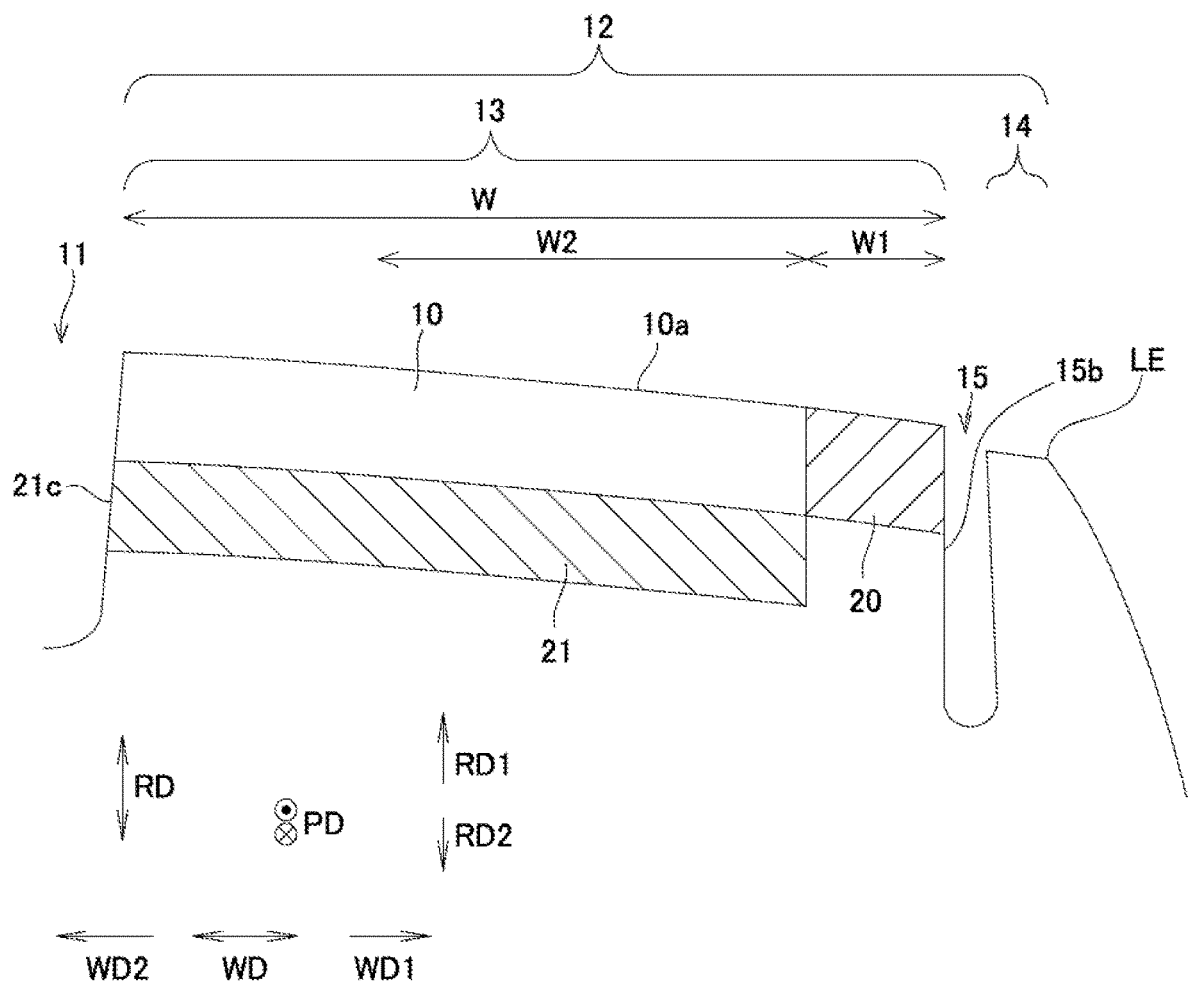

FIG. 4 shows a variation. However, as shown in FIG. 4, at the end toward the interior WD2 in the tire width direction of main lug portion 13, in a situation in which no sipe is formed thereat, innermost end 21c in the tire width direction of high-modulus rubber 21 reaches major groove 11, being arranged at the end toward the interior WD2 in the tire width direction of main lug portion 13. The reason for this is so that even if stepped wear occurs it will still be possible for progress of stepped wear to be suppressed by high-modulus rubber 21.

Figure 5:
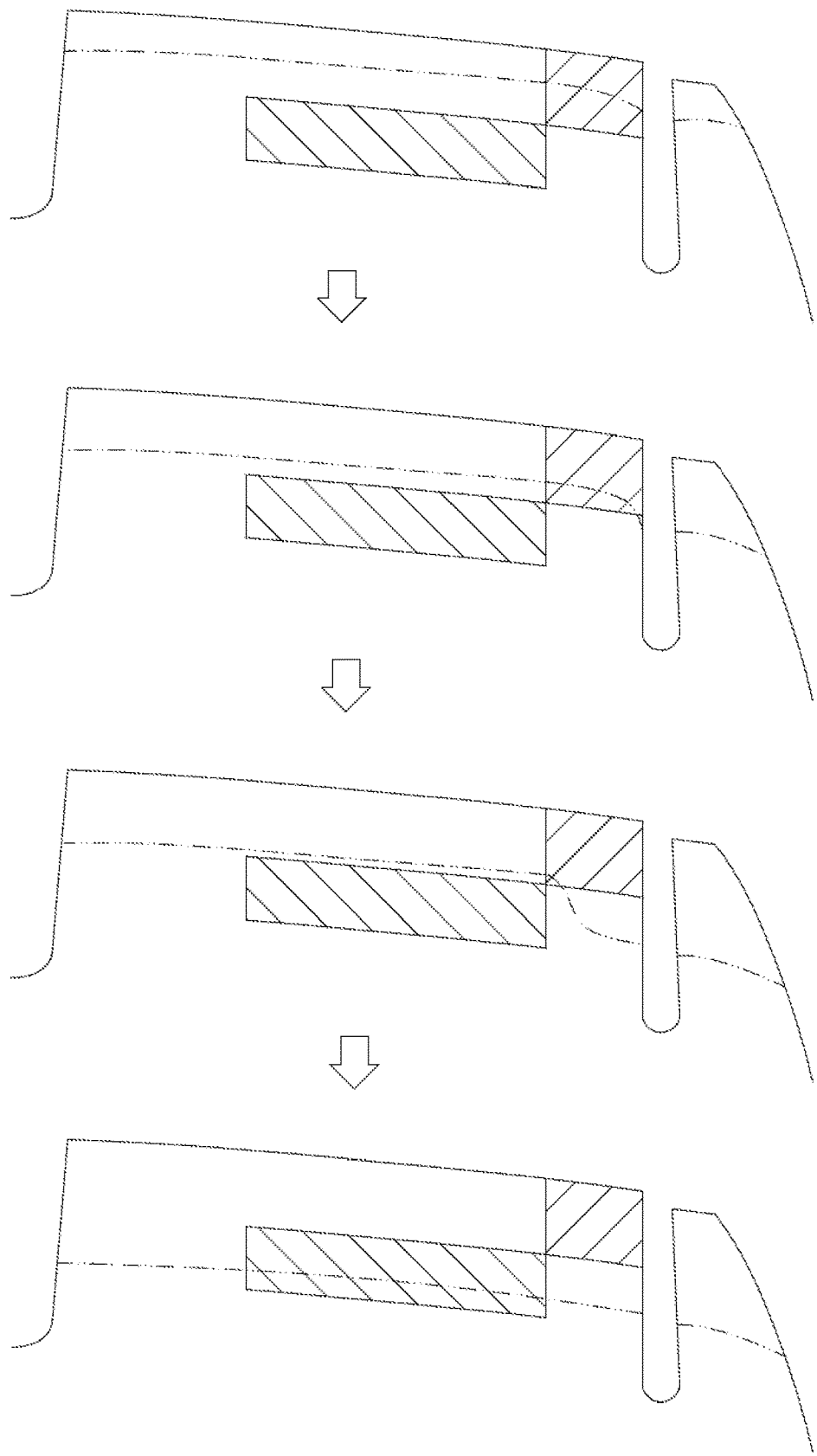
Figure 6:
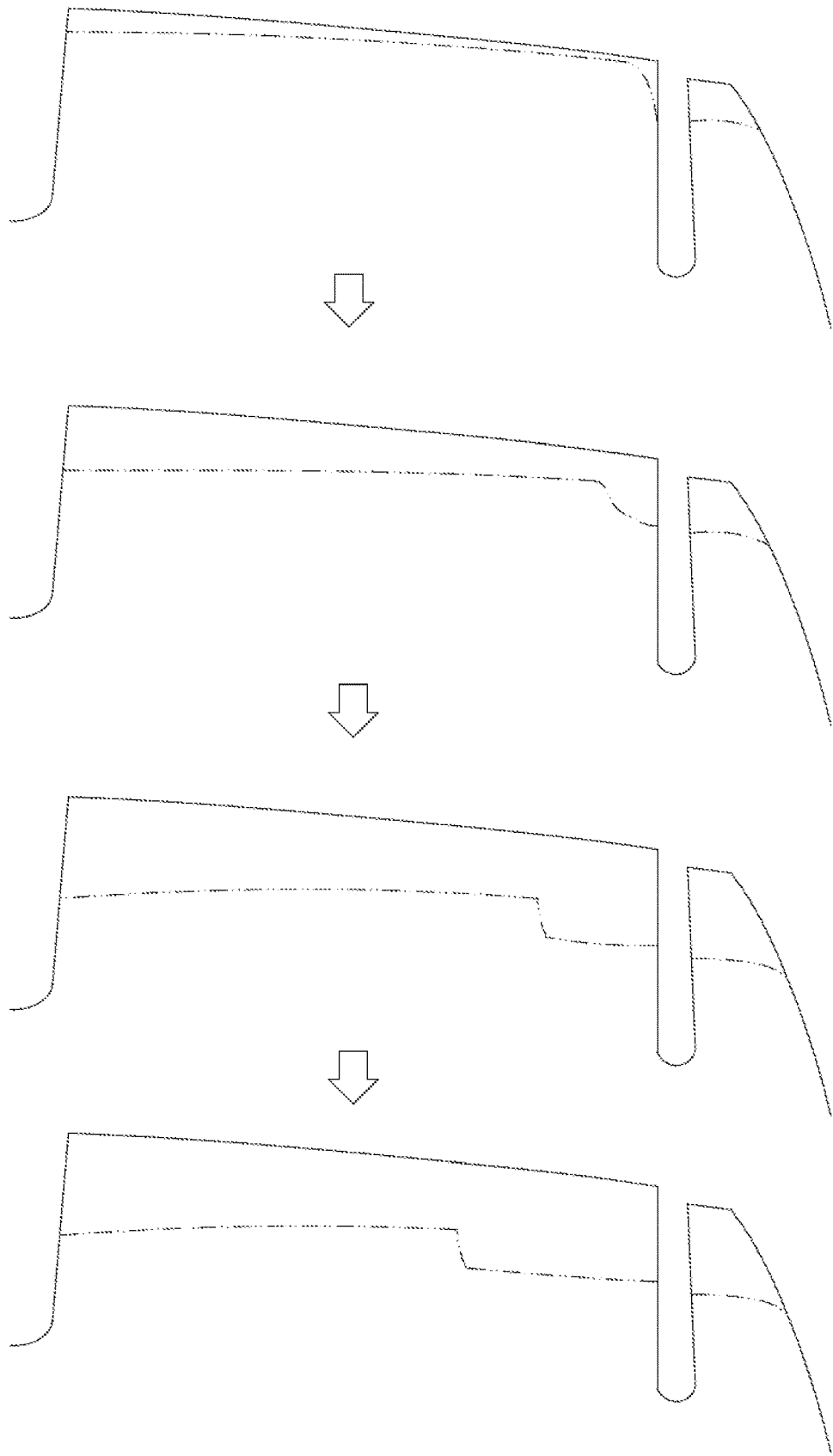
FIG. 6 Drawing of a tire meridional section showing schematically the way in which wear might occur at a conventional tire

FIG. 5 shows, in time series fashion, the manner in which wear occurs at the tire shown in FIG. 1. FIG. 6 shows, in time series fashion, the manner in which wear occurs at a conventional tire. Comparing the first diagram at each of FIG. 5 and FIG. 6, it is clear that low-modulus rubber 20 causes delay in wear at the end of main lug portion 13. The second through the fourth diagrams at FIG. 6 show that following the appearance of stepped wear, the stepped wear progresses toward the interior in the tire width direction. In contradistinction thereto, looking at the third and fourth diagrams in FIG. 5, with a tire in accordance with the present embodiment, even if stepped wear should begin to occur, because high-modulus rubber 21 will quickly wear toward the interior RD2 in the tire radial direction, it is clear that, progress of stepped wear toward the interior of the lug being suppressed, wear is uniform.

As described above, a pneumatic radial tire in accordance with the present embodiment comprises cap rubber 10 which forms contact patch 10a. Cap rubber 10 has a plurality of lugs that extend in the tire circumferential direction PD and that are partitioned by major groove(s) 11 extending in the tire circumferential direction PD. Shoulder lug 12, which among the plurality of lugs is that which is located outwardmost in the tire width direction WD, has narrow groove 15 which extends in the tire circumferential direction PD and which partitions shoulder lug 12 into main lug portion 13 toward the interior WD2 in the tire width direction, and sacrificial lug portion 14 toward the exterior WD1 in the tire width direction. Low-modulus rubber 20, for which the stress at a given elongation is lower than that of cap rubber 10, is arranged at the corner where contact patch 10a at main lug portion 13 and groove side face 15b toward the interior WD2 in the tire width direction which forms narrow groove 15 intersect.

Because low-modulus rubber 20, for which the stress at a given elongation is lower than that of cap rubber 10, is thus arranged at the corner of main lug portion 13, contact patch pressure at the end of main lug portion 13 is alleviated, shear force and slippage in the tire width direction WD are made small, abrasive energy at the end of main lug portion 13 is reduced, and it is possible to delay occurrence of wear at the end of main lug portion 13. It is therefore possible to suppress occurrence of uneven wear.

In accordance with the present embodiment, depth H1 along the tire radial direction RD of low-modulus rubber 20 is not less than 30% of depth D along the tire radial direction RD of narrow groove 15 as measured from contact patch 10a.

In accordance with such constitution, when the progress of wear is divided into three stages, these being the initial stage of wear, the intermediate stage thereof, and the final stage thereof, it is possible to properly suppress wear at the corner of the main lug portion during the initial stage of wear.

In accordance with the present embodiment, width W1 along the tire width direction WD of low-modulus rubber 20 is not less than 10% of width W along the tire width direction WD of main lug portion 13.

As this range is a location at which wear tends to proceed, contact patch pressure being high as compared with that toward the center of main lug portion 13, inasmuch as it is the corner of main lug portion 13, the foregoing constitution is a preferred embodiment that permits the benefits of the present disclosure to be readily obtained.

In accordance with the present embodiment, high-modulus rubber 21, for which the stress at a given elongation is higher than that of cap rubber 10, is arranged at a region that is toward the interior RD2 in the tire radial direction and that is toward the interior WD2 in the tire width direction from low-modulus rubber 20.

While employment of low-modulus rubber 20 suppresses occurrence of wear at the end of main lug portion 13, stepped wear will nonetheless eventually occur. It is the region toward the interior of the lug from low-modulus rubber 20 that is subject to erosion by stepped wear. If high-modulus rubber 21 were not present at location(s) subject to erosion by stepped wear, the force from braking would cause stepped wear to progress toward the interior WD2 in the tire width direction. But by, as is the case in the present embodiment, causing high-modulus rubber 21 to be present at location(s) subject to erosion by stepped wear, because wear directed toward the interior RD2 in the tire radial direction will occur more readily than the stepped wear that would otherwise have proceeded toward the interior WD2 in the tire width direction, it will be possible to suppress progress of stepped wear, and there will be a tendency for the wear that occurs at main lug portion 13 to be a more uniform sort of wear that is directed toward the interior RD2 in the tire radial direction.

If, as shown in FIG. 2A, the locations in the tire radial direction RD of high-modulus rubber 21 and low-modulus rubber 20 were to overlap, high-modulus rubber 21 would become exposed before low-modulus rubber 20 could be completely worn away, causing deterioration in the way in which wear occurs. To address this, because in accordance with the present embodiment high-modulus rubber 21 is arranged toward the interior RD2 in the tire radial direction from low-modulus rubber 20, it is possible to prevent deterioration in the way in which wear occurs.

If, as shown in FIG. 3A, the locations in the tire width direction WD of high-modulus rubber 21 and low-modulus rubber 20 were to overlap; i.e., high-modulus rubber 21 were to be arranged below low-modulus rubber 20, this would impede uniform wear. To address this, because in accordance with the present embodiment high-modulus rubber 21 is arranged toward the interior WD2 in the tire width direction from low-modulus rubber 20, it is possible to prevent a situation in which uniform wear is impeded.

In accordance with the present embodiment, outside end 21a in the tire radial direction of high-modulus rubber 21 and inside end 20a in the tire radial direction of low-modulus rubber 20 are coplanar. This is a preferred embodiment.

In accordance with the present embodiment, outside end 21b in the tire width direction of high-modulus rubber 21 and inside end 20b in the tire width direction of low-modulus rubber 20 are coplanar. This is a preferred embodiment.

At FIG. 1 in accordance with the present embodiment, main lug portion 13 has sipe S that extends toward the exterior WD1 in the tire width direction from adjacent major groove 11 toward the interior WD2 in the tire width direction at main lug portion 13 and that terminates at the interior of main lug portion 13. Innermost end 21c in the tire width direction of high-modulus rubber 21 is arranged at a location that, as viewed along the tire circumferential direction PD, does not appear to overlap sipe S.

The region at which sipe S is arranged is such that braking forces are relieved, there is little tendency for slippage, stepped wear tends not to happen, and wear proceeds in such fashion as to be directed toward the interior RD2 in the tire radial direction. Because as in the present embodiment innermost end 21c in the tire width direction of high-modulus rubber 21 is arranged at a location that, as viewed along the tire circumferential direction PD, does not appear to overlap sipe S, wear of the region at which sipe S is arranged is not further promoted by high-modulus rubber 21, and wear that is uniform overall can be expected.

At shown in FIG. 4 in accordance with the present embodiment, at the end toward the interior WD2 in the tire width direction of main lug portion 13, no sipe being formed, innermost end 21c in the tire width direction of high-modulus rubber 21 is arranged at the end toward the interior WD2 in the tire width direction of main lug portion 13.

In accordance with such constitution, because no sipe is formed at the end toward the interior WD2 in the tire width direction of main lug portion 13, there is a possibility that stepped wear will occur, but even if stepped wear were to occur, it will be possible for the progress of the stepped wear to be suppressed by high-modulus rubber 21.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic radial tire comprising cap rubber that forms a contact patch;
    wherein the cap rubber has a plurality of lugs that extend in a tire circumferential direction and that are partitioned by a major groove extending in the tire circumferential direction;
    a shoulder lug, which among the plurality of lugs is that which is located outwardmost in a tire width direction, has a narrow groove that extends in the tire circumferential direction and that partitions the shoulder lug into a main lug portion toward the interior in the tire width direction, and a sacrificial lug portion toward the exterior in the tire width direction; low-modulus rubber, for which stress at a given elongation is lower than that of the cap rubber, is arranged at a corner where the contact patch at the main lug portion and a groove side face toward the interior in the tire width direction which forms the narrow groove intersect; and
    high-modulus rubber, for which stress at a given elongation is higher than that of the cap rubber, is arranged at a region that is toward the interior in a tire radial direction and that is toward the interior in the tire width direction from the low-modulus rubber.

2. The tire according to claim 1 wherein depth along a tire radial direction of the low-modulus rubber is not less than 30% of depth along the tire radial direction of the narrow groove as measured from the contact patch.

3. The tire according to claim 1 wherein width along the tire width direction of the low-modulus rubber is not less than 10% of width along the tire width direction of the main lug portion.

4. The tire according to claim 1 wherein an outside end in the tire radial direction of the high-modulus rubber and an inside end in the tire radial direction of the low-modulus rubber are coplanar.

5. The tire according to claim 1 wherein an outside end in the tire width direction of the high-modulus rubber and an inside end in the tire width direction of the low-modulus rubber are coplanar.

6. The tire according to claim 1 wherein
    the main lug portion has a sipe that extends toward the exterior in the tire width direction from adjacent major groove toward the interior in the tire width direction at the main lug portion and that terminates at the interior of the main lug portion; and
    an innermost end in the tire width direction of the high-modulus rubber is arranged at a location that, as viewed along the tire circumferential direction, does not appear to overlap the sipe.

7. The tire according to claim 1 wherein
    no sipe is formed at an end toward the interior in the tire width direction of the main lug portion; and an innermost end in the tire width direction of the high-modulus rubber is arranged at the end toward the interior in the tire width direction of the main lug portion.

* * * * *